US006379432B1

United States Patent
Matacotta et al.

(10) Patent No.: US 6,379,432 B1
(45) Date of Patent: Apr. 30, 2002

(54) METHOD AND COMPOUND FOR THE SELECTIVE ADSORPTION OF NITROGEN OXIDES

(75) Inventors: Francesco Cino Matacotta, Trieste; Gianluca Calestani, Parma, both of (IT)

(73) Assignees: Consiglio Nazionale Delle Ricerche, Rome; Universita' Degli Studi di Bologna, Bologna, both of (IT)

( * ) Notice: Subject to any disclaimer, the term of this patent is extended or adjusted under 35 U.S.C. 154(b) by 0 days.

(21) Appl. No.: 09/463,159

(22) PCT Filed: Jul. 16, 1998

(86) PCT No.: PCT/EP98/04432

§ 371 Date: Apr. 17, 2000

§ 102(e) Date: Apr. 17, 2000

(87) PCT Pub. No.: WO99/04881

PCT Pub. Date: Feb. 4, 1999

(30) Foreign Application Priority Data

Jul. 23, 1997 (IT) .......................................... BO97A0453

(51) Int. Cl.$^7$ ................................................ B01D 53/04
(52) U.S. Cl. ............................ 95/129; 95/900; 96/108; 423/239.1; 502/400
(58) Field of Search ........................... 95/128, 129, 900; 423/212, 239.1; 502/340, 345, 400

(56) References Cited

U.S. PATENT DOCUMENTS

| 5,238,913 A | | 8/1993 | Coppa ........................... 505/1 |
| 5,312,607 A | * | 5/1994 | Schiabel et al. ...... 423/239.1 X |
| 6,033,461 A | * | 3/2000 | Yang et al. ................... 95/129 |
| 6,174,835 B1 | * | 1/2001 | Naito et al. .......... 423/239.1 X |

FOREIGN PATENT DOCUMENTS

| JP | 52-056088 | * | 5/1977 | .................. 95/129 |
| SU | 1357053 | * | 12/1998 | .................. 95/129 |
| WO | WO97/28884 A | | 8/1997 | |

* cited by examiner

*Primary Examiner*—Robert H. Spitzer
(74) *Attorney, Agent, or Firm*—Guido Modiano; Albert Josif; Daniel O'Bryne

(57) ABSTRACT

A method for selectively absorbing nitrogen oxides $NO_x$ from gaseaous mixtures containing carbon dioxide or carbon dioxide and water and optionally contaminants chosen among CO, $SO_2$, hydrocarbons and mixtures thereof, comprising placing the gaseous mixtures in contact with absorber compounds having formula $Ba_2Cu_3O_{5+d}$, where d is a number from 0.6 to 1. New compounds having the above formula are characterized by high resistance to carbonatation and by specific Raman spectra.

21 Claims, 4 Drawing Sheets

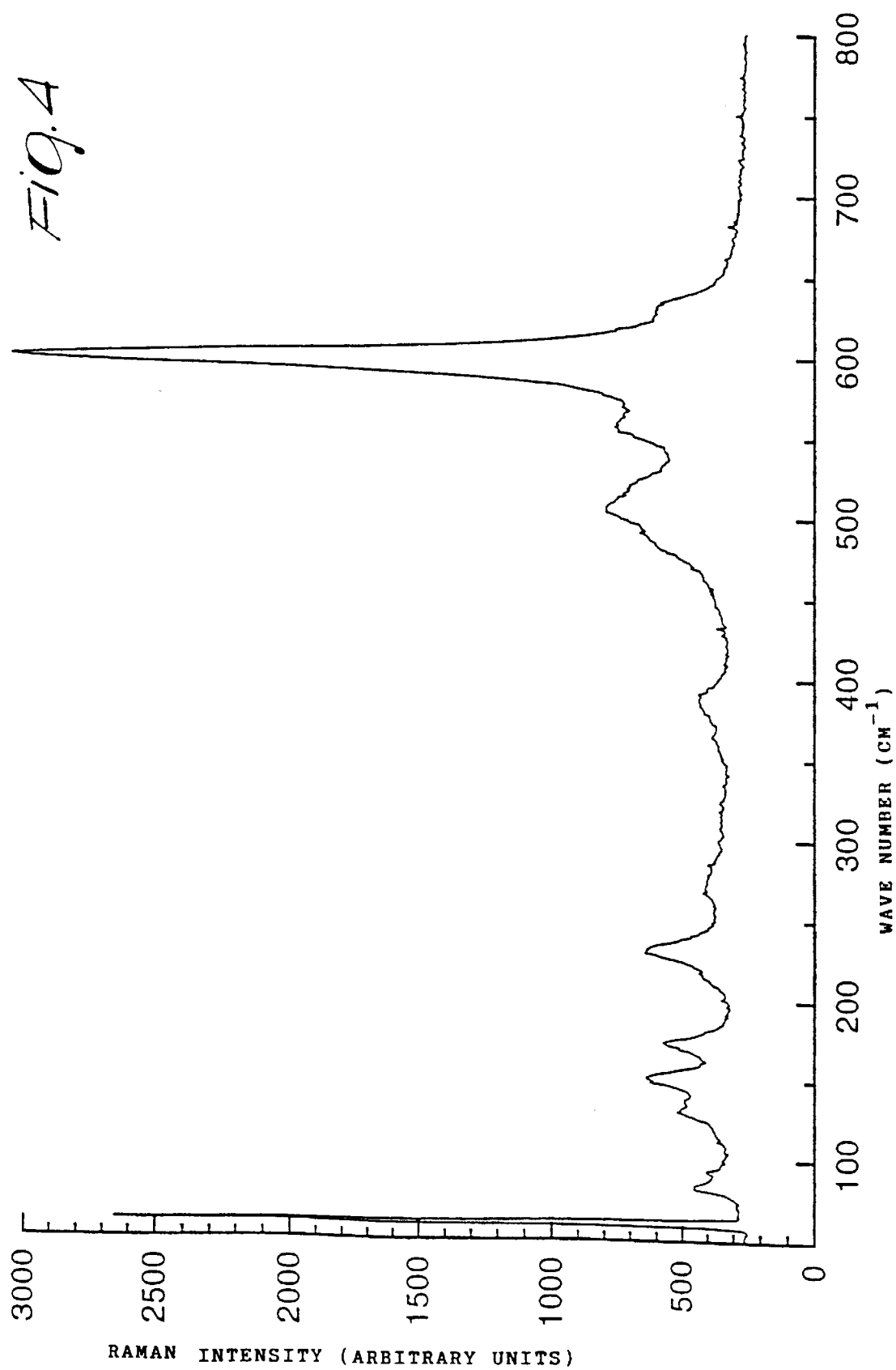

METHOD AND COMPOUND FOR THE SELECTIVE ADSORPTION OF NITROGEN OXIDES

TECHNICAL FIELD

Figure 1:
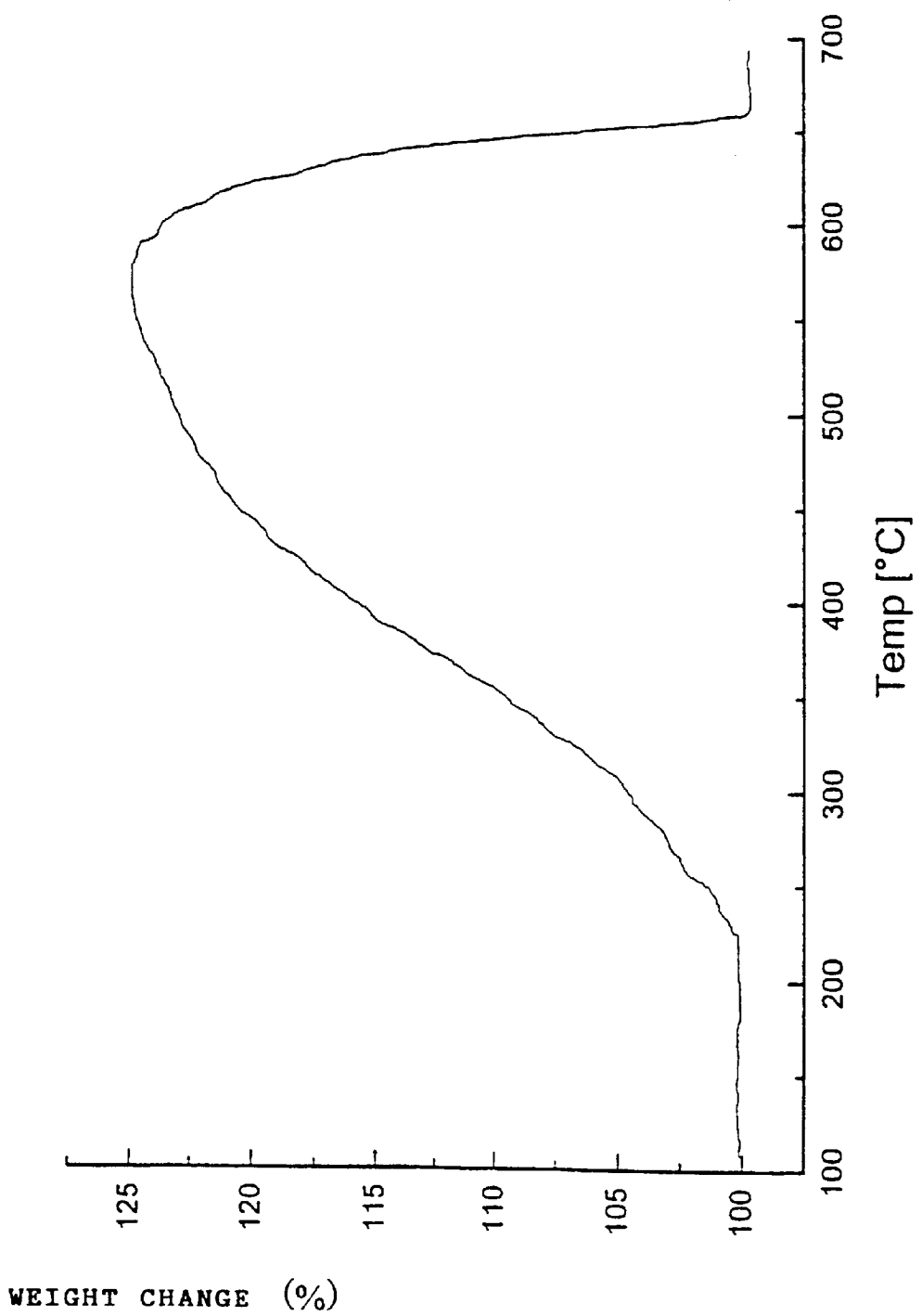

The present invention relates to a compound and a method for the selective absorption of NO, nitrogen oxides from gaseous mixtures containing carbon dioxide.

In particular, it relates to the absorption of nitrogen oxides from the exhaust gas of internal-combustion engines.

BACKGROUND ART

The literature (M. Machida et al.—J. Chem. Soc., Chem. Commun. (1990), p. 1165, and New Frontiers in Catalysis, Proc. of the 10th Intern. Congress on Catalysis, Budapest, Hungary, Elsevier (1993) p. 2644) describes mixed barium-copper oxides which are given the formula $BaCuO_x$, where x has the values of 2.1 and 25, and are capable of reversibly absorbing nitrogen oxides by working within a certain temperature range, fixing them as barium nitrites and nitrates, and of releasing them by heating to temperatures higher than the absorption values, restoring the structure of the initial oxides.

The above mentioned mixed oxides are highly reactive also to carbon dioxide, which they fix as highly stable barium carbonate which, by depositing on the surface of the material, inhibits its further absorbing capability.

High reactivity to carbon dioxide therefore prevents use of compounds $BaCuO_x$ to absorb nitrogen oxides from mixtures rich in carbon dioxide, such as the exhaust gas of motor vehicles.

An attempt has been made to obviate this drawback by using mixtures of $BaCuO_{2.1}/MnO_2$ which are scarcely sensitive to carbonatation.

Finally, it has been found that $BaCuO_x$ compounds tend to lose, over time, their capability of absorbing nitrogen oxides.

Application EP-A-666 102 describes the use of substances for adsorbing nitrogen oxides from the exhaust gas of engines designed to work with an excess of oxygen in the air/gasoline mix, capable of adsorbing NO and of converting it into $NO_2$ by virtue of the action of the excess oxygen that is present in the mix.

When the engine runs with an oxygen deficit (air/gasoline mix rich in gasoline), the adsorbed nitrogen dioxide reacts with the reducing gases that are present in the mix (CO and unburnt hydrocarbons), becoming $N_2$ and oxidizing the reducing gases to $CO_2$ and $H_2O$.

The adsorbers used in the European application are essentially constituted by mixtures of barium carbonate and copper oxide formed locally during preparation by decomposition of copper nitrate and barium acetate with Ba/Cu ratios within broad ranges (from 1:3 to 3:1).

Said adsorbers, however, are entirely inactive in fixing nitrogen oxides in the absence of oxygen or in case of oxygen deficit, such as when the engine, at startup, runs with gasoline-rich air/gasoline mixes.

Furthermore, the temperature window in which the adsorbers are active is shifted toward high temperatures, thus preventing adsorption when the engine is running cold.

WO 97/28884 discloses a compound of formula $Ba_2Cu_3O_6$ suitable for adsorbing gases, among others, carbon dioxide.

U.S. Pat. No. 5,238,913 reports that compounds of formula $Ba_2Cu_3O_{5+x}$ (OL X L1) are suitable for preparing superconducting microcircuits. No indications are given about the method of preparation of the compounds and, in particular no mention is made of the compound $Ba_2Cu_3O_6$.

DISCLOSURE OF THE INVENTION

It has now been unexpectedly found that the compound having the formula $Ba_2Cu_3O_6$ and the Raman spectrum characteristics as set forth in the claims is capable of selectively absorbing nitrogen oxides NOx from gaseous mixtures rich in carbon dioxide, possibly containing pollutants such as CO, $SO_2$, hydrocarbons and mixtures thereof. Absorption occurs at temperatures between approximately 180° C. and 480° C., working at atmospheric pressure.

It has furthermore been found, and it is another aspect of the invention, that nitrogen oxide absorption kinetics is accelerated considerably by the presence of water vapor in the mixtures. In the case of $NO_2$, the presence of oxygen and moisture shifts the absorption toward relatively low temperatures comprised between approximately 180° C. and ambient temperature. Preferably, $NO_2$ absorption is performed at temperatures above 35° C.–40° C.

By effect of the absorption of considerable amounts of $NO_x$ oxides, the compound of the invention decomposes forming barium nitrite and mono- and divalent copper oxides, if they are exposed to NO in the absence of oxygen, barium nitrate and bivalent copper oxide, if they are exposed to $NO_2$ or NO in the presence of oxygen.

Figure 2:
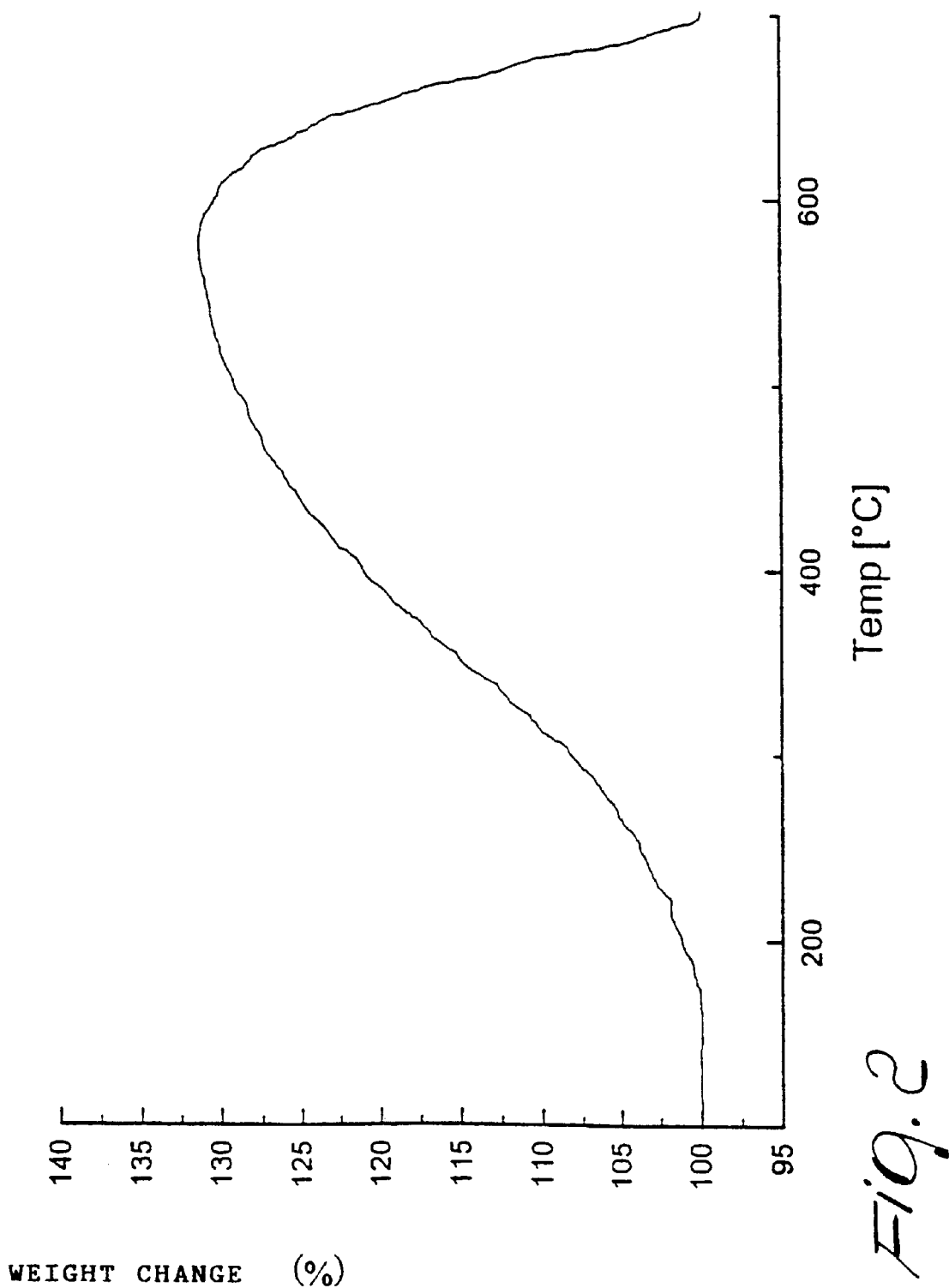

The thermogravimetric curves plotted in FIGS. 1 and 2 show the absorption of NO and NO2 as a function of the temperature (absorption of mixtures of 25% NO and 3% $O_2$ in helium, with a space velocity of 3000/h and 2.5% $NO_2$ and 2% $O_2$ in helium/nitrogen with a space velocity of 3000/h and a heating rate of 20° C./min (percentages expressed by volume)).

By heating to temperatures above approximately 480° C., the compounds that have formed begin to decompose, releasing the nitrogen oxides and restoring the $Ba_2Cu_3O_6$ structure of the starting compound.

At temperatures above 480° C., barium nitrite and nitrate and copper oxide begin to react with each other, forming the compound $Ba_2Cu_3O_6$ and releasing, respectively, NO and $NO_2$ and possibly oxygen. In the range between 480° and 700° C., $Ba_2Cu_3O_6$ coexists alongside with barium nitrite and nitrate and with copper oxide; the $Ba_2Cu_3O_6$ fraction increases with time and temperature.

The selectivity of the $Ba_2Cu_3O_6$ with respect to $CO_2$ depends considerably on the preparation method.

It has been found, and it is another aspect of the invention, that the compound of the invention considerably increases its resistance to carbonatation if it is prepared starting from barium nitrate and copper oxide intimately mixed in a cationic ratio of 2:3, subsequently heating the mixture to 640° C.–650° C. in an air stream until the barium nitrate is completely decomposed and then cooling the mixture in air stream at a rate of no more than 20° C./min.

The air can be replaced with oxygen/nitrogen mixtures or oxygen/inert gas mixtures containing up to 25 g/m³ of water vapor and up to 400 ppm of $CO_2$.

It has furthermore been found that the presence of nitrogen oxides during the cooling of the material, or their addition to the reaction atmosphere to complete the synthesis, facilitate the formation of the carbonatation-resistant materials.

Figure 3:
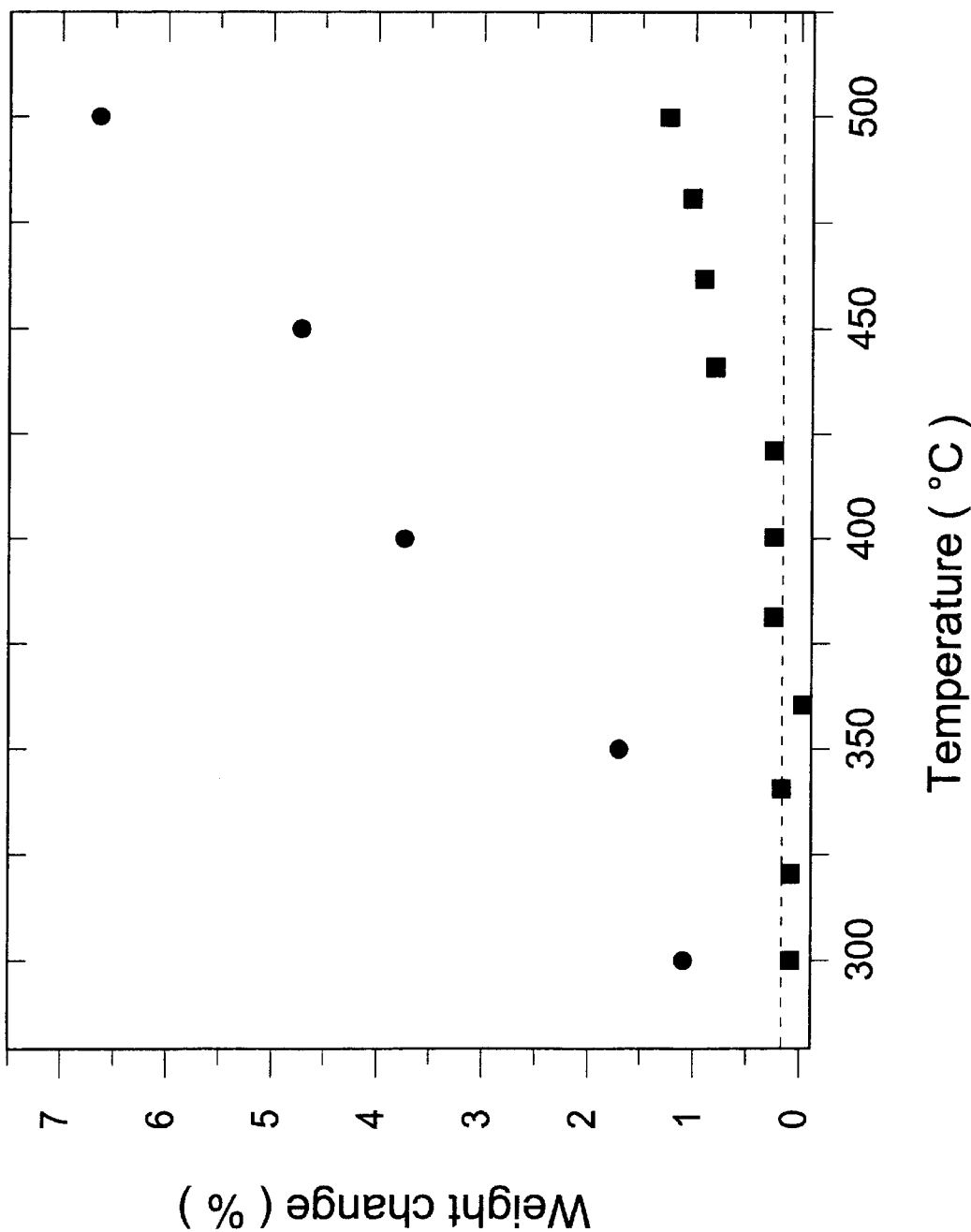

The curve of carbonatation as a function of temperature which is typical of the compound $Ba_2Cu_3O_6$ thus prepared as above specified is reported in FIG. 3 (stream of 10% $CO_2$, 10% $H_2O$, complement with mixtures of nitrogen and argon, exposure 5 hours, percentages by volume).

For comparison, the circles indicate the carbonatation behaviour of a non-resistant compound $BaCuO_{2.5}$ prepared according to the methods described in literature.

The carbonatation curve of the compound supported on alumina is similar to the curve of the above mentioned compound. The preparation is made by immersing porous aluminum oxide, dehydrated beforehand, in a near-saturated solution of barium nitrate and copper nitrate in deionized water, using a barium ion/copper ion ratio of 2:3 and working at temperatures between 20° C. and 80° C.

The material, impregnated with the solution, is dried at 110° C.–150° C. and then subjected to the above described heat treatment (reaction at 640° C.–650° C. and then cooling at a rate of no more than 20° C./min).

The procedure can be repeated in order to increase the filling of the pores of the aluminum oxide until saturation is reached.

Approximately 3.5% by weight of supported compound is obtained for each impregnation/heat treatment cycle.

The curve of FIG. 3 shows that the compound $Ba_2Cu_3O_6$ prepared as mentioned above is not sensitive to carbonatation up to approximately 420° C. (less than 0.4% increase in weight after 5 h of exposure). The increase is less than 2% at 500 ° C., again after 5 h of exposure.

Resistance to carbonatation decreases considerably if the compound $Ba_2Cu_3O_6$ is prepared at 800° C. and then cooled quickly to ambient temperature (rate of approximately 5° C./sec).

Table 1 reports the weight increases by isothermal treatments in NO 1% by volume, 99% $N_2$ of $Ba_2Cu_3O_6$, in comparison with the "compound" $Ba_2CuO_{2.5}$ prepared according to the methods described in literature.

TABLE 1

| "$BaCuO_{2.5}$" | 300° C. | 400° C. | 500° C. |
|---|---|---|---|
| 12 hours | 17.4% | 17.1% | 7.9% |
| 36 hours | 17.3% | 17.4% | 11.5% |
| 60 hours | 17.5% | 17.4% | 12.9% |
| $Ba_2Cu_3O_6$ | 300° C. | 400° C. | 500° C. |
| 12 hours | 17.8% | 16.5% | 11.7% |
| 36 hours | 19.5% | 19.8% | 19.3% |
| 60 hours | 21.7% | 21.5% | 18.2% |

The table shows that the compound $BaCuO_{2.5}$ ceases to absorb after approximately 12 h at temperatures between 300° C. and 400° C., whilst absorption continues at 500° C. Absorption at 500° C. is slightly more than half the absorption of $Ba_2Cu_3O_6$, which instead continues to absorb prolonged periods at all temperatures from 300° C. to 500° C.

The Raman spectrum of the carbonatation-resistant compound $Ba_2Cu_3O_6$ (prepared as herein before indicated) shown in FIG. 4 shows that the maximum intensity peak in the wave number range from 0 to 800 $cm^{-1}$ appears at wave number of 598±5 $cm^{-1}$, and that at wave number 633±3 $cm^{-1}$ there is a mode whose intensity is between 0% and 30% of the intensity of the mode that appears at 598±5 $cm^{-1}$, or that said mode is absent.

It is also found that at wave number 560±5 $cm^{-1}$ there is a mode whose intensity is 30% less than the intensity of the mode that appears at 598±5 $cm^{-1}$. A symmetric band is centered around wave number 520±7 $cm^{-1}$ and has an intensity between 20% and 40% of the intensity of the mode that appears at 598±5 $cm^{-1}$.

The Raman spectra were recorded with a Dilor LabRam apparatus, using a laser beam at 632.8 nm with an intensity of 1 mW, focused on sample portions measuring 1 micron in diameter.

X-ray diffraction measurements of powders and of single crystals show that the compound $Ba_2Cu_3O_6$ crystalizes in the rhombic system, with cells characterized by the lattice parameters 4.18 $\in$<a<4.35 Å, 6.83 $\in$<a<7.33 Å and c=11.39±0.02 Å, which are the result of the distortion of a hexagonal packing in which 4.05 Å<a<4.28 Å, c =11.39±0.02 Å and the angle δ changes from 120° to a value between 115° and 118°.

The X-ray diffraction spectrum (powder diffraction) of the carbonatation-resistant compounds shows that the intensity of the reflections that can be detected at the angles 2 θ=29.7°×0.05° and 2θ=30.3°±0.05° is very weak and lower than 10% of the intensity of the intense reflection at 2θ=29.00°±0.05°. The lower the intensity of these reflections, the higher the resistance to carbonatation.

The powder X-ray diffraction measurements were made using a Philips X-pert diffractometer constituted by a PW1830/40 generator, PW3719 goniometer and PW3710 control unit using Cu Kα radiation.

Advantageously, in order to increase the exposed surface area, the compounds used in the absorption method of the invention are supported on porous carriers having surface area higher than 50 $m^2$/g preferably higher than 100 $m^2$/g and more preferably comprised in the range of 150–500 $m^2$/g, which are inert towards the reactants used for preparing the compounds.

Examples of said carriers are alumina, titania, zirconia, boron nitride, silicon carbide.

As mentioned, the compounds according to the invention are applied particularly in the absorption of $NO_x$ oxides from the exhaust gas of internal-combustion engines.

By virtue of the capability to absorb and desorb oxides at temperatures in the range between approximately 200° C. and 700° C., the compounds are used in mufflers preferably placed in a portion of the exhaust pipe which is at a temperature between approximately 200° C. and 500° C. when the motor is running cold and at temperatures above approximately 550° C. when the motor is running steady.

Another application of interest of the compounds relates to the absorption of nitrogen dioxide ($NO_2$) from the fumes of plants such as those for nitric acid and for preparing silicon.

Other applications of the compounds relate to the absorption of $NO_x$ oxides from the exhaust fumes of domestic heating systems or from fuel-burning electric power stations.

In the case of the absorption of nitrogen oxides from the exhaust fumes of fixed plants, such as heating systems or fuel-burning power stations, the compounds $Ba_2Cu_3O5+d$, once they have been converted into Ba nitrites and nitrates, can be restored to the initial fully active form by heating.

It has been found that the compounds $Ba_2Cu_3O_{5+d}$ which have already been subjected to absorption of $NO_x$ oxides and have not been fully decomposed into barium nitrate and cupric oxide oxidize hydrocarbons to $CO_2$ and $H_2O$ and CO to $CO_2$ even in the absence of oxygen at temperatures lower than those of pure compounds $Ba_2Cu_3O_{5+d}$.

Following test illustrates the above behaviour.

Since the compounds decompose into barium nitrate and cupric oxide which do not contribute to the catalytic reaction, the maximum activity is found in the materials which have been exposed to $NO_x$ oxides just until the decomposition starting point.

Porous alumina was impregnated in a solution of $Ba(NO_3)_2$ and $Cu(NO_3)_2$ in a cationic ratio of 2:3, dried at 150° C. and then treated at 650° C. until full nitrate decomposition was achieved. The resulting product was quickly cooled to ambient temperature and was found to be constituted by 3.5% by weight of the compound $Ba_2Cu_3O_{5+d}$. Part of this material was exposed for 1 hour to a stream of gas composed of 90% synthetic air, 2% $H_2O$ and 8% $NO_2$. Under these conditions, approximately 50% of the compound $Ba_2Cu_3O_6$ decomposed to barium nitrate and copper nitrate. The material was then heated in air at 250° C. to convert the copper nitrate into copper oxide. The treatment with oxygen can be omitted when the material is used in the oxidation reaction at 250° C. or higher temperatures.

0.5 grams of material thus prepared were introduced in a reactor to measure the catalytic yield in methane oxidation. The gas in the reactor was constituted by a mixture of methane/oxygen/nitrogen in the proportions 2/18/80, flowing at 700 cc/min (84000/hour).

As the temperature increased, the yields listed in Table 2 were found; these yields are expressed as the percentage of methane converted into $CO_2+H_2O$ and compared with the yields of a sample of the same material in pure form.

It has been found that the activity of the compounds $Ba_2Cu_3O_5+d$ can be significantly increased by promoting them with oxides selected from cerium oxide, zirconium oxide and the oxides of the rare earth metals particularly lanthanum and cerium. The amount of the promoter generally is up to 10% by weight expressed as metal.

TABLE 2

| Temperature (° C.) | Yield of the material after $NO_2$ absorption (%) | Yield of material in pure form (%) |
| --- | --- | --- |
| 300 | 0.0 | 0.0 |
| 350 | 3.0 | 0.0 |
| 400 | 3.8 | 1.6 |
| 450 | 9.8 | 6.7 |
| 500 | 20.0 | 16.1 |
| 550 | 91.8 | 40.2 |
| 600 | 100.0 | 100.0 |

What is claimed is:

1. A compound $Ba_2Cu_3O_6$ characterized by a Raman spectrum having a maximum intensity peak in the wave number range from 0 to 800 $cm^{-4}$ of a mode at a ware number of $598\pm5$ $cm^{-4}$, and in which at wave number $633\pm3$ $cm^{-4}$ here is a mode whose intensity is at least 30% lower than the intensity of the mode at $598\pm5$ $cm^{-4}$, or no mode is present.

2. The compound according to claim 1, wherein in the Raman spectrum there is, at wave number $560\pm5$ $cm^{-1}$, a mode whose intensity is 30% less than the intensity of the mode at $598\pm5$ $cm^{-1}$.

3. The compound $Ba_2Cu_3O_6$ having the Raman spectrum as characterized in claim 2, which comprises a symmetric band which is centered at wave number $520\pm7$ $cm^{-1}$ and has an intensity between 20% and 40% of the intensity of the mode at $598\pm5$ $cm^{-1}$.

4. The compound according to claim 1, supported on inert porous carriers having surface area higher than 50 $m^2/g$.

5. The compound according to claim 1, which has been exposed to $NO_x$ oxides until a point of not complete decomposition of the compound to barium nitrate and cupric oxide is reached.

6. The compound according to claim 5, wherein the exposition to $NO_x$ oxides has been discontinued at the point of the starting decomposition of the compound.

7. The compound according to claim 1, containing a promoter selected from the group consisting of cerium oxide, zirconium oxide and the oxides of the rare earth metals.

8. The compound $Ba_2Cu_3O_6$ according to claim 1, characterized by resistance to carbonatation in a stream of 10% $CO_2$, 10% $H_2O$, the complement being a mixture of nitrogen and argon, measured by the increase in weight of the compound, of less than 0.4% at 420° C. after 5 hours of exposure and less than 2% at 500° C. again after 5 hours of exposure.

9. A process for the preparation of the compound of claim 1, comprising heating a mixture of barium nitrate and copper oxide in a cationic g-atom ratio of 2:3 at a temperature of 640°–650° C. in air stream until barium nitrate is completely decomposed and then cooling the reaction mixture in air stream at a rate of no more than 20° C./min.

10. The process according to claim 9, wherein the air stream is replaced with oxygen/nitrogen mixtures containing up to $25g/m^3$ of water vapor and up to 400 ppm of $CO_2$.

11. The process according to claim 9, wherein the reaction atmosphere and/or the cooling atmosphere is added with nitrogen oxides.

12. A compound Ba2Cu3O6 obtainable by a method according to claim 9, characterized by a Raman spectrum wherein a mode at a wave number of $598+/-5$ $cm^{-1}$ has a maximum intensity in the wave number range from 1 to 800 $cm^{-1}$, and a mode at a wave number $633+/-3$ $cm^{-1}$ is absent or has an intensity at least 30% lower than the intensity of the mode at $598+/-5$ $cm^{-1}$.

13. A compound Ba2Cu3O6 characterized by a Raman spectrum wherein a mode at a wave number of $598+/-5$ $cm^{-1}$ has a maximum intensity in the wave number range from 1 to 800 $cm^{-1}$, a mode at a wave number $633+/-3$ $cm^{-1}$ is absent or has an intensity at least 30% lower than the intensity of the mode at $598+/-5$ $cm^{-1}$, and a mode at a wave number $560+/-5$ $cm^{-1}$ has an intensity at least 30% lower than the intensity of the mode at $598+/-5$ $cm^{-1}$, and which comprises a symmetric band which is centered at wave number $520+/-7$ $cm^{-1}$ and has an intensity between 20% and 40% of the intensity of the mode at $598+/-5$ $cm^{-1}$, the product being obtainable by a method according to claim 9.

14. A method for selectively absorbing nitrogen oxides NOx from gaseous mixtures containing carbon dioxide or carbon dioxide and water, comprising contacting the gaseous mixtures with absorbers comprising a compound $Ba_2Cu_3O_6$ having the characteristics set forth in claim 1.

15. The method according to claim 14, wherein absorption is performed in the presence of oxygen.

16. The method according to claim 14, wherein absorption is performed at temperatures between 180 and 480° C.

17. The method according to claim 14, wherein the nitrogen oxides are absorbed from gas mixtures formed of the exhaust gas of internal-combustion engines.

18. The method according to claim 17, wherein the compounds are used in mufflers located in a portion of the exhaust pipe that is at temperatures between 200° C. and 550° C. when the engine runs cold and in a portion that reaches temperatures above 550° C. when the engine runs warm.

19. A method for absorbing $NO_2$ from exhaust fumes of nitric acid plants or silicon production plants, wherein the fumes are passed over absorbers which comprise a compound according to claim 1.

20. The method according to claim 19, wherein absorption is performed at a temperature between 40 and 180° C.

21. A method for absorbing $NO_x$ nitrogen oxides from the exhaust fumes of domestic heating systems or fuel-burning power stations, wherein the fumes are passed over absorbers which comprise a compound according to claim 1.

* * * * *